US012613769B2

(12) United States Patent
Ayyapureddi

(10) Patent No.: US 12,613,769 B2
(45) Date of Patent: Apr. 28, 2026

(54) APPARATUSES AND METHODS FOR READ/MODIFY/WRITE SINGLE-PASS METADATA ACCESS OPERATIONS

(71) Applicant: MICRON TECHNOLOGY, INC., Boise, ID (US)

(72) Inventor: Sujeet Ayyapureddi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 60 days.

(21) Appl. No.: 18/747,635

(22) Filed: Jun. 19, 2024

(65) Prior Publication Data

US 2025/0110825 A1 Apr. 3, 2025

Related U.S. Application Data

(60) Provisional application No. 63/587,486, filed on Oct. 3, 2023.

(51) Int. Cl.
| | |
|---|---|
| *G06F 11/10* | (2006.01) |
| *G06F 11/00* | (2006.01) |
| *G11C 29/42* | (2006.01) |

(52) U.S. Cl.
CPC .......... *G06F 11/1008* (2013.01); *G06F 11/10* (2013.01)

(58) Field of Classification Search
CPC ............. G06F 11/1016; G06F 11/1068; G06F 11/1048; G11C 29/42; G11C 2029/0411; G11C 2029/4402
See application file for complete search history.

(56) References Cited

U.S. PATENT DOCUMENTS

| | | | |
|---|---|---|---|
| 5,177,705 A | 1/1993 | Mcelroy et al. |
| 5,299,164 A | 3/1994 | Takeuchi et al. |
| 5,434,814 A | 7/1995 | Cho et al. |
| 6,249,476 B1 | 6/2001 | Yamazaki et al. |
| 7,117,421 B1 | 10/2006 | Danilak |
| 8,891,313 B2 | 11/2014 | Chang et al. |
| 9,158,617 B2 | 10/2015 | Cho et al. |

(Continued)

FOREIGN PATENT DOCUMENTS

| | | |
|---|---|---|
| WO | 2016048634 A1 | 3/2016 |
| WO | 2024107367 A1 | 5/2024 |

(Continued)

OTHER PUBLICATIONS

Lumenci Team "High Bandwidth Memory (HBM3)" https://lumenci.com/blogs/high-bandwidth-memory; Editorial Team at Lumenci, Jul. 14, 2022; pp. 1-3.

(Continued)

*Primary Examiner* — Justin R Knapp
(74) *Attorney, Agent, or Firm* — Dorsey & Whitney LLP

(57) ABSTRACT

Apparatuses, systems, and methods for read/modify/write single-pass metadata access operations. During a write a memory receives data bits and at least one metadata bit and a column address which includes column select bits and column sub-select bits. A column decoder selects a set of bit lines in an extra column plane based on the column select bits and a set of bits is read out. A subset of that set of bits is selected based on the column sub-select bits and over-written with the at least one metadata bit. The modified set of bits is written back to the extra column plane.

20 Claims, 5 Drawing Sheets

500 ⌐

510 ⌐
Receiving a Write Command and a Column Address Including Column Sub-select Bits 520 ⌐
Receiving a Plurality of Data Bits and at least One Metadata Bit 530 ⌐
Reading a Set of Bits from an Extra Column Plane 540 ⌐
Selecting a Subset of the Set of Bits Based on a Value of the Column Sub-select Bits 550 ⌐
Generating a Modified Set of Bits by Overwriting the Selected Subset of the Set of Bits with the at least One Metadata Bit 560 ⌐
Writing the Modified Set of Bits to the Extra Column Plane

(56) References Cited

U.S. PATENT DOCUMENTS

| | | | |
|---|---|---|---|
| 9,195,537 B2 | 11/2015 | Sharon et al. | |
| 9,201,728 B2 | 12/2015 | Patapoutian et al. | |
| 9,361,960 B2 | 6/2016 | Vogelsang | |
| 9,547,550 B1* | 1/2017 | Thakore | G06F 11/1068 |
| 9,607,679 B1 | 3/2017 | Kim et al. | |
| 9,666,291 B2 | 5/2017 | Park | |
| 9,880,901 B2 | 1/2018 | Zastrow | |
| 9,996,799 B2 | 6/2018 | Bostick et al. | |
| 10,127,101 B2 | 11/2018 | Halbert et al. | |
| 10,222,989 B1 | 3/2019 | Zitlaw | |
| 10,243,590 B1 | 3/2019 | Seshadri | |
| 10,810,079 B2 | 10/2020 | Halbert et al. | |
| 10,817,371 B2 | 10/2020 | Rooney et al. | |
| 10,872,011 B2 | 12/2020 | Bains et al. | |
| 10,929,033 B2 | 2/2021 | Meeker et al. | |
| 10,937,517 B1 | 3/2021 | Rich-Plotkin et al. | |
| 10,963,336 B2 | 3/2021 | Veches | |
| 11,010,304 B2 | 5/2021 | Kang et al. | |
| 11,074,126 B2 | 7/2021 | Prather et al. | |
| 11,088,710 B2 | 8/2021 | Lee et al. | |
| 11,177,012 B1 | 11/2021 | Avraham et al. | |
| 11,200,961 B1 | 12/2021 | Uribe | |
| 11,264,085 B1* | 3/2022 | Ware | G06F 13/1678 |
| 11,538,515 B2 | 12/2022 | Ji et al. | |
| 11,579,971 B2 | 2/2023 | Ayyapureddi | |
| 11,580,038 B2* | 2/2023 | Norman | H01L 25/0657 |
| 11,615,861 B2 | 3/2023 | Kim et al. | |
| 12,001,707 B2 | 6/2024 | Boehm et al. | |
| 12,014,797 B2 | 6/2024 | Ayyapureddi | |
| 12,019,513 B2 | 6/2024 | Ayyapureddi | |
| 12,095,474 B1 | 9/2024 | Zhu et al. | |
| 12,204,410 B2 | 1/2025 | Sutera et al. | |
| 12,204,770 B2 | 1/2025 | Ayyapureddi | |
| 12,230,347 B2 | 2/2025 | Suh et al. | |
| 12,249,393 B2 | 3/2025 | Reohr | |
| 2003/0081492 A1 | 5/2003 | Farrell et al. | |
| 2003/0117838 A1 | 6/2003 | Hidaka | |
| 2006/0233030 A1 | 10/2006 | Choi | |
| 2008/0089129 A1 | 4/2008 | Lee | |
| 2008/0313493 A1 | 12/2008 | Roohparvar et al. | |
| 2009/0097348 A1 | 4/2009 | Minzoni et al. | |
| 2009/0132876 A1 | 5/2009 | Freking et al. | |
| 2009/0168523 A1 | 7/2009 | Shirakawa et al. | |
| 2009/0196103 A1 | 8/2009 | Kim et al. | |
| 2010/0177582 A1 | 7/2010 | Kim et al. | |
| 2010/0177587 A1 | 7/2010 | Huang | |
| 2010/0290146 A1 | 11/2010 | Lam | |
| 2011/0154158 A1 | 6/2011 | Yurzola et al. | |
| 2012/0092940 A1 | 4/2012 | Chang et al. | |
| 2013/0117630 A1 | 5/2013 | Kang | |
| 2014/0126300 A1 | 5/2014 | Takahashi et al. | |
| 2015/0193464 A1 | 7/2015 | Kwon et al. | |
| 2015/0262631 A1 | 9/2015 | Shimizu | |
| 2016/0070507 A1 | 3/2016 | Hoshikawa et al. | |
| 2016/0092307 A1 | 3/2016 | Bonen et al. | |
| 2016/0125920 A1 | 5/2016 | Kim et al. | |
| 2016/0307645 A1 | 10/2016 | Kim et al. | |
| 2017/0060681 A1 | 3/2017 | Halbert et al. | |
| 2017/0062067 A1 | 3/2017 | Yang et al. | |
| 2017/0091025 A1 | 3/2017 | Ahn et al. | |
| 2017/0192843 A1 | 7/2017 | Warnes et al. | |
| 2017/0249097 A1 | 8/2017 | Eguchi | |
| 2017/0269992 A1 | 9/2017 | Bandic et al. | |
| 2017/0285990 A1 | 10/2017 | Chen et al. | |
| 2017/0286213 A1 | 10/2017 | Li | |
| 2017/0344423 A1 | 11/2017 | Hsiao et al. | |
| 2018/0025760 A1 | 1/2018 | Mazumder et al. | |
| 2018/0121283 A1 | 5/2018 | Plants | |
| 2018/0150350 A1 | 5/2018 | Cha et al. | |
| 2018/0301203 A1 | 10/2018 | Kim | |
| 2019/0066816 A1 | 2/2019 | Dono | |
| 2019/0073261 A1 | 3/2019 | Halbert et al. | |
| 2019/0103154 A1 | 4/2019 | Cox et al. | |
| 2019/0197171 A1 | 6/2019 | Tiwari et al. | |
| 2019/0206478 A1 | 7/2019 | Jun | |
| 2019/0362792 A1 | 11/2019 | Oh et al. | |
| 2019/0369893 A1 | 12/2019 | Ross | |
| 2019/0371403 A1 | 12/2019 | Maejima | |
| 2020/0019462 A1 | 1/2020 | Prather et al. | |
| 2020/0051616 A1 | 2/2020 | Cho | |
| 2020/0104205 A1 | 4/2020 | Noguchi et al. | |
| 2020/0104208 A1 | 4/2020 | Heo et al. | |
| 2020/0194050 A1 | 6/2020 | Akamatsu | |
| 2020/0226039 A1 | 7/2020 | Lee | |
| 2020/0321060 A1 | 10/2020 | Lang et al. | |
| 2020/0373941 A1 | 11/2020 | Latorre et al. | |
| 2021/0011645 A1 | 1/2021 | Martinelli et al. | |
| 2021/0012817 A1 | 1/2021 | Laurent et al. | |
| 2021/0012849 A1 | 1/2021 | Kim et al. | |
| 2021/0057003 A1 | 2/2021 | Prather et al. | |
| 2021/0064119 A1 | 3/2021 | Mirichigni et al. | |
| 2021/0064282 A1 | 3/2021 | He et al. | |
| 2021/0064461 A1 | 3/2021 | Veches | |
| 2021/0064467 A1 | 3/2021 | Buerkle et al. | |
| 2021/0083687 A1 | 3/2021 | Lee et al. | |
| 2021/0142848 A1 | 5/2021 | Lim et al. | |
| 2021/0142860 A1 | 5/2021 | Song et al. | |
| 2021/0200630 A1 | 7/2021 | Ishikawa et al. | |
| 2021/0208967 A1 | 7/2021 | Cha et al. | |
| 2021/0224155 A1 | 7/2021 | Bains et al. | |
| 2021/0247910 A1 | 8/2021 | Kim et al. | |
| 2021/0272627 A1 | 9/2021 | Lee | |
| 2021/0294692 A1 | 9/2021 | Chen | |
| 2021/0311821 A1 | 10/2021 | Ryu et al. | |
| 2021/0311822 A1 | 10/2021 | Jannusch et al. | |
| 2021/0311830 A1 | 10/2021 | Lee | |
| 2021/0357287 A1 | 11/2021 | Kim et al. | |
| 2021/0358559 A1 | 11/2021 | Suh et al. | |
| 2021/0365316 A1 | 11/2021 | Nale et al. | |
| 2021/0406123 A1 | 12/2021 | Nakanishi et al. | |
| 2022/0027090 A1 | 1/2022 | Kwon et al. | |
| 2022/0035529 A1 | 2/2022 | Bennett | |
| 2022/0084565 A1 | 3/2022 | Prather et al. | |
| 2022/0091938 A1 | 3/2022 | Buerkle et al. | |
| 2022/0129196 A1 | 4/2022 | Roberts et al. | |
| 2022/0138065 A1 | 5/2022 | Secatch et al. | |
| 2022/0197739 A1 | 6/2022 | Ryu et al. | |
| 2022/0261310 A1 | 8/2022 | Ishikawa et al. | |
| 2022/0334917 A1 | 10/2022 | Veches | |
| 2022/0337271 A1 | 10/2022 | Hanna | |
| 2022/0365692 A1 | 11/2022 | Vankamamidi et al. | |
| 2022/0398042 A1 | 12/2022 | Song et al. | |
| 2022/0415398 A1 | 12/2022 | Lien et al. | |
| 2023/0146549 A1 | 5/2023 | Lien et al. | |
| 2023/0161665 A1 | 5/2023 | Choi et al. | |
| 2023/0185665 A1 | 6/2023 | Ayyapureddi | |
| 2023/0223096 A1 | 7/2023 | Bains et al. | |
| 2023/0236747 A1 | 7/2023 | Curewitz et al. | |
| 2023/0289072 A1 | 9/2023 | Cho et al. | |
| 2023/0298682 A1 | 9/2023 | Suh et al. | |
| 2023/0350581 A1 | 11/2023 | Ayyapureddi | |
| 2023/0350748 A1 | 11/2023 | Ayyapureddi | |
| 2023/0352064 A1 | 11/2023 | Ayyapureddi | |
| 2023/0352112 A1 | 11/2023 | Ayyapureddi | |
| 2024/0004754 A1 | 1/2024 | Veches | |
| 2024/0079074 A1 | 3/2024 | Bak et al. | |
| 2024/0086520 A1 | 3/2024 | Kaplan et al. | |
| 2024/0096404 A1 | 3/2024 | Cho et al. | |
| 2024/0126438 A1 | 4/2024 | Suh et al. | |
| 2024/0160351 A1 | 5/2024 | Ayyapureddi et al. | |
| 2024/0160524 A1 | 5/2024 | Ayyapureddi et al. | |
| 2024/0160527 A1 | 5/2024 | Ayyapureddi et al. | |
| 2024/0161855 A1 | 5/2024 | Smith et al. | |
| 2024/0161856 A1 | 5/2024 | Smith et al. | |
| 2024/0161859 A1 | 5/2024 | Ayyapureddi et al. | |
| 2024/0170088 A1 | 5/2024 | Smith et al. | |
| 2024/0176699 A1 | 5/2024 | Ayyapureddi et al. | |
| 2024/0177794 A1* | 5/2024 | Vogelsang | G11C 29/52 |
| 2024/0220142 A1 | 7/2024 | Park | |
| 2024/0220149 A1 | 7/2024 | Kim et al. | |
| 2024/0248796 A1 | 7/2024 | Ayyapureddi | |
| 2024/0256380 A1 | 8/2024 | Ayyapureddi | |
| 2024/0256382 A1 | 8/2024 | Ayyapureddi | |
| 2024/0272979 A1 | 8/2024 | Ayyapureddi | |

(56)            References Cited

U.S. PATENT DOCUMENTS

| | | | |
|---|---|---|---|
| 2024/0272984 A1 | 8/2024 | Ayyapureddi |
| 2024/0273014 A1 | 8/2024 | Ayyapureddi |
| 2024/0274223 A1 | 8/2024 | Ayyapureddi |
| 2024/0281327 A1 | 8/2024 | Ayyapureddi et al. |
| 2024/0289266 A1 | 8/2024 | Ayyapureddi |
| 2024/0321328 A1 | 9/2024 | Ayyapureddi |
| 2024/0377952 A1 | 11/2024 | Song et al. |
| 2024/0394178 A1 | 11/2024 | Partsch |
| 2024/0419538 A1 | 12/2024 | Huang et al. |
| 2025/0077103 A1 | 3/2025 | Ayyapureddi |
| 2025/0077424 A1 | 3/2025 | Ayyapureddi |
| 2025/0078906 A1 | 3/2025 | Kim et al. |
| 2025/0078949 A1 | 3/2025 | Ayyapureddi |
| 2025/0078950 A1 | 3/2025 | Ayyapureddi |
| 2025/0110643 A1 | 4/2025 | Ayyapureddi |
| 2025/0110830 A1 | 4/2025 | Ayyapureddi |
| 2025/0111887 A1 | 4/2025 | Ayyapureddi |
| 2025/0112643 A1 | 4/2025 | Ayyapureddi |
| 2025/0123924 A1 | 4/2025 | Ayyapureddi et al. |
| 2025/0138940 A1 | 5/2025 | Cho et al. |
| 2025/0156087 A1 | 5/2025 | Ayyapureddi |

FOREIGN PATENT DOCUMENTS

| | | |
|---|---|---|
| WO | 2024107503 A1 | 5/2024 |
| WO | 2024107504 A1 | 5/2024 |
| WO | 2024167711 A1 | 8/2024 |
| WO | 2025053912 A1 | 3/2025 |
| WO | 2025075696 A1 | 4/2025 |
| WO | 2025075697 A1 | 4/2025 |

OTHER PUBLICATIONS

U.S. Appl. No. 17/730,381, titled "Apparatuses, Systems, and Methods for Per Row Error Scrub Information", filed Apr. 27, 2022; pp. all pages of application as filed.

U.S. Appl. No. 17/730,396, titled "Apparatuses, Systems, and Methods for Per Row Error Scrub Information Registers", filed Apr. 27, 2022; pp. all pages of application as filed.

U.S. Appl. No. 17/731,024, titled "Apparatuses, Systems, and Methods for Managing Metadata Storage at a Memory", filed Apr. 27, 2022; pp. all pages of the application as filed.

U.S. Appl. No. 18/424,282 titled "Apparatuses and Methods for Bounded Fault Compliant Metadata Storage" filed Jan. 26, 2024; pp. all pages of application as filed.

U.S. Appl. No. 18/424,342 titled "Apparatuses and Methods for Bounded Fault Compliant Metadata Storage" filed Jan. 26, 2024; pp. all pages of application as filed.

U.S. Appl. No. 18/430,381, titled "Apparatuses, Systems, and Methods for Storing Memory Metadata", filed Feb. 1, 2024; pp. all pages of application as filed.

U.S. Appl. No. 18/430,406, titled "Apparatuses, Systems, and Methods for Storing Memory Metadata", filed Feb. 1, 2024; pp. all pages of application as filed.

U.S. Appl. No. 18/431,232, titled "Apparatuses, Systems, and Methods for Storing Memory Metadata", filed Feb. 2, 2024; pp. all pages of application as filed.

U.S. Appl. No. 18/431,306, titled "Apparatuses, Systems, and Methods for Storing Memory Metadata", filed Feb. 2, 2024; pp. all pages of application as filed.

U.S. Appl. No. 18/441,775 titled "Apparatuses and Methods for Settings for Adjustable Write Timing" filed Feb. 14, 2024, pp. all pages of the application as filed.

U.S. Appl. No. 18/441,830 titled "Apparatuses, Systems, and Methods for Storing and Accessing Memory Metadata and Error Correction Code Data" filed Feb. 14, 2024, pp. all pages of the application as filed.

U.S. Appl. No. 18/504,215 titled "Apparatuses and Methods for Enhanced Metadata Support" filed Nov. 8, 2023; pp. all pages of application as filed.

U.S. Appl. No. 18/504,234 titled "Apparatuses and Methods for Enhanced Metadata Support" filed Nov. 8, 2023; pp. all pages of application as filed.

U.S. Appl. No. 18/504,302 titled "Apparatuses and Methods for Configurable ECC Modes" filed Nov. 8, 2023; pp. all pages of application as filed.

U.S. Appl. No. 18/504,316 titled "Apparatuses and Methods for Configurable ECC Modes" filed Nov. 8, 2023; all pages of application as filed.

U.S. Appl. No. 18/504,324 titled "Apparatuses and Methods for Single-Pass Access of ECC Information, Metadata Information or Combinations Thereof" filed Nov. 8, 2023, all pages of application as filed.

U.S. Appl. No. 18/504,342 titled "Apparatuses and Methods for Single-Pass Access of ECC Information, Metadata Information or Combinations Thereof" filed Nov. 8, 2023; pp. all pages of application as filed.

U.S. Appl. No. 18/504,353 titled "Apparatuses and Methods for Separate Write Enable for Single-Pass Accessof Data, Metadata, and Parity Information" filed Nov. 8, 2023; pp. all pages of application as filed.

U.S. Appl. No. 18/504,362 titled "Apparatuses and Methods for Separate Write Enable for Single-Pass Access of Data, Metadata, and Parity Information" filed Nov. 8, 2023; pp. all pages of application as filed.

U.S. Appl. No. 18/625,539, titled "Apparatuses, Systems, and Methods for Per Row Error Scrub Information" filed Apr. 3, 2024, pp. all pages of application as filed.

U.S. Appl. No. 18/734,189, titled "Apparatuses, Systems, and Methods for Managing Metadata Storage at a Memory" filed Jun. 5, 2024, pp. all pages of application as filed.

U.S. Appl. No. 18/743,994 titled "Apparatuses and Methods for Shared Codeword in 2-PASS Access Operations" filed Jun. 14, 2024, pp. all pages of the application as filed.

U.S. Appl. No. 18/745,577 titled "Apparatuses and Methods for Half-Page Modes of Memory Devices" filed Jun. 17, 2024, pp. all pages of the application as filed.

U.S. Appl. No. 18/745,843 titled "Apparatuses and Methods for Half-Page Modes of Memory Devices" filed Jun. 17, 2024, pp. all pages of the application as filed.

U.S. Appl. No. 17/730,992 titled "Apparatuses, Systems, and Methods for Managing Metadata Security and Access" filed Apr. 27, 2022, pp. all pages of application as filed.

PCT Application No. PCT/US24/39192 titled "Apparatuses and Methods for Scalable 1-Pass Error Correction Code Operations" filed Jul. 23, 2024, pp. all pages of the application as filed.

PCT Application No. PCT/US24/39195 titled "Apparatuses and Methods for Half-Page Modes of Memory Devices" filed Jul. 23, 2024, pp. all pages of the application as filed.

PCT Application No. PCT/US24/39231 titled "Apparatuses and Methods for Granular Single-Pass Metadata Access Operations" filed Jul. 24, 2024, pp. all pages of the application as filed.

Chen et al., "CATCAM: Constant-time Alteration Ternary CAM with Scalable In-Memory Architecture"; 2020 53rd Annual IEEE/ACM International Symposium on Microarchitecture (MICRO), Athens, Green; Oct. 17-21, 2020; pp. 342-355.

J. F. Philippe Marchand "An Alterable Programmable Logic Array"; IEEE Journal of Solid-State Circuits, vol. sc-20, No. 5, Oct. 1985; pp. 1061-1066.

U.S. Appl. No. 19/025,934, titled "Apparatuses, Systems, and Methods for Managing Metadata Security and Access" filed Jan. 16, 2025, pp. all pages of application as filed.

U.S. Appl. No. 18/745,877 titled "Apparatuses and Methods for Half-Page Modes of Memory Devices" filed Jun. 17, 2024, pp. all pages of the application as filed.

U.S. Appl. No. 18/745,894 titled "Apparatuses and Methods for Half-Page Modes of Memory Devices" filed Jun. 17, 2024, pp. all pages of the application as filed.

U.S. Appl. No. 18/747,658, titled "Apparatuses and Methods for Bounded Fault Compliant Metadata Storage" filed Jun. 19, 2024, pp. all pages of application as filed.

(56) References Cited

OTHER PUBLICATIONS

U.S. Appl. No. 18/747,676, titled "Apparatuses and Methods for Alternate Memory Die Metadata Storage", filed Jun. 19, 2024, pp. all pages of application as filed.

U.S. Appl. No. 18/747,696, titled "Apparatuses and Methods for Scalable 1-Pass Error Correction Code Operations", filed Jun. 19, 2024, pp. all pages of application as filed.

U.S. Appl. No. 18/747,712, titled "Apparatuses and Methods for Granular Single-Pass Metadata Access Operations" filed Jun. 19, 2024, pp. all pages of application as filed.

U.S. Appl. No. 19/360,159 titled "Apparatuses and Methods for Enhanced Metadata Support" filed Oct. 16, 2025; pp. all pages of the application as filed.

U.S. Appl. No. 19/366,908 titled "Apparatuses and Methods for Configurable Ecc Modes", filed Oct. 23, 2025; pp. all pages of application as filed.

U.S. Appl. No. 19/376,027 titled "Apparatuses and Methods for Single-Pass Access of ECC Information, Metadata Information or Combinations Thereof", filed Oct. 31, 2025; pp. all pages of application as filed.

U.S. Appl. No. 19/381,448 titled "Apparatuses and Methods for Enhanced Metadata Support", filed Nov. 6, 2025; pp. all pages of application as filed.

U.S. Appl. No. 19/431,541, titled "Apparatuses And Methods For Bounded Fault Compliant Metadata Storage" filed Dec. 23, 2025, pp. all pages of application as filed.

U.S. Appl. No. 19/435,124 titled "Apparatuses, Systems, and Methods for Storing Memory Metadata", filed Dec. 29, 2025; pp. all page of the application as filed.

U.S. Appl. No. 19/441,648, titled "Apparatuses, Systems, and Methods for Storing and Accessing Memory Metadata and Error Correction Code Data" filed Jan. 6, 2026; pp. all pages of application as filed.

Handy, Jim, "Emerging Memories Today: Understanding Bit Selectors", The Memory Guy Blog, Objective Analysis on Semiconductor Memories, Nov. 2018, 5 pgs.

* cited by examiner

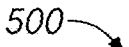

500

510

Receiving a Write Command and a Column Address Including Column Sub-select Bits

520

Receiving a Plurality of Data Bits and at least One Metadata Bit

530

Reading a Set of Bits from an Extra Column Plane

540

Selecting a Subset of the Set of Bits Based on a Value of the Column Sub-select Bits

550

Generating a Modified Set of Bits by Overwriting the Selected Subset of the Set of Bits with the at least One Metadata Bit

560

Writing the Modified Set of Bits to the Extra Column Plane

FIG. 5

APPARATUSES AND METHODS FOR READ/MODIFY/WRITE SINGLE-PASS METADATA ACCESS OPERATIONS

CROSS REFERENCE TO RELATED APPLICATION(S)

This application claims the benefit under 35 U.S.C. § 119 of the earlier filing date of U.S. Provisional Application Ser. No. 63/587,486 filed Oct. 3, 2023 the entire contents of which is hereby incorporated by reference in its entirety for any purpose.

BACKGROUND

This disclosure relates generally to semiconductor devices, and more specifically to semiconductor memory devices. In particular, the disclosure relates to volatile memory, such as dynamic random access memory (DRAM). Information may be stored on individual memory cells of the memory as a physical signal (e.g., a charge on a capacitive element). During an access operation, an access command may be received along with address information which specifies which memory cells should be accessed.

There is a growing interest in enabling the memory to store information in the array which is associated with pieces of data. For example, error correction information and/or metadata may be stored in the array along with their associated data. There may be a need to ensure that such information can be accessed along with the specified data without unduly impacting the performance of the device.

BRIEF DESCRIPTION OF THE DRAWINGS

FIG. 5 is a flow chart of a method of writing metadata according to some embodiments of the present disclosure.

DETAILED DESCRIPTION

Figure 1:
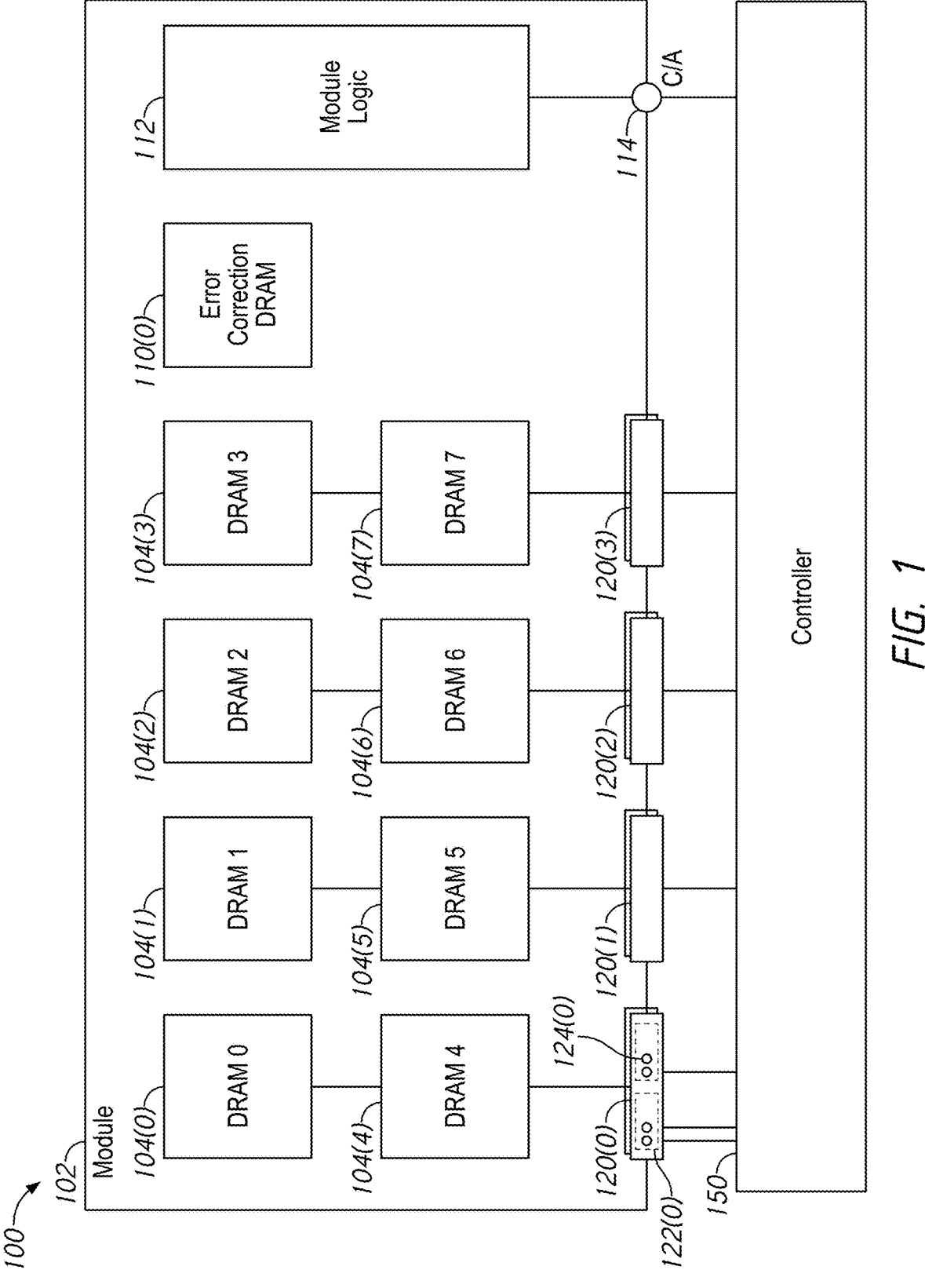
FIG. 1 is a block diagram of a memory system according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Memory arrays may generally include a number of memory cells arranged at the intersection of word lines (rows) and bit lines/digit lines (columns). The columns may be grouped together into column planes, and a column select (CS) signal may be used to select a set of columns within each of the active column planes to provide data. When an access command is received, the memory may access data in memory cells at the intersection of a row specified by a memory address, and the bit lines associated with one or more CS signals which are provided based on a column address. During an example write operation a controller provides addresses and a data codeword, and the bits of the data codeword are written to the memory array at the memory cells specified by the addresses. During an example read operation the controller provides addresses and the memory retrieves the data from the specified location.

Memory devices may also store additional information which is associated with each data codeword. For example, the additional information may include parity bits which are used as part of an error correction scheme, metadata which includes information about the data codeword (or is a portion of information about a larger set of data which includes the codeword), or combinations thereof. However, it may be desirable to not increase the physical size of the array (e.g., the number of memory cells). Accordingly, as the amount of additional information increases, more of the usable space of the array may need to be set aside for additional information instead of data.

Some memories may include a set of data column planes, and an extra column plane which stores additional information. However, it may be desirable to include a greater number of bits additional information than can be retrieved from the extra column plane alone. Accordingly, the additional information may be stored in more than one column plane (e.g., one column plane may be used for parity while another is used for metadata). The number of parity bits may generally match the number of bits which are accessed in a column plane by a column select signal (e.g., 8 bits). In some implementations, there may be a desire to use fewer bits of metadata than are accessed in a column plane. However, this may cause issues as if the memory accesses all 8 bit lines during a write operation, the bit lines which are not being written to may be inadvertently altered. There may be a need to ensure that the bit lines which are not being written to are protected.

The present disclosure is drawn to apparatuses, systems, and methods for granular single-pass metadata access operations. An example memory device of the present disclosure operates in a mode where the data codeword has fewer than the maximum amount of bits that the memory is capable of accessing at one time. For example, the memory device may have a plurality of column planes and the data codeword may be stored in a selected portion (e.g., a selected half) of those column planes. One or more column planes in the non-selected portion, as well as the extra column plane, may be used to store the additional information. In this way the data and the additional information may be accessed in a single access pass (e.g., without incurring a column-to-column delay time such as tCCD). During an example access operation, there may be 1 or 2 bits of metadata, but 8 bit lines may be activated by the column select signal. A memory device according to the present disclosure may protect the non-accessed bit lines by using a read/modify/ write (RMW) cycle to ensure that the non-accessed memory cells selected by a CS signal are not inadvertently modified.

In an example embodiment of the present disclosure, the memory device may use a RMW cycle to protect the bits. During an example write operation, the CS signal is provided to the column plane where the metadata is stored. The 8 bit lines are activated and the data stored at the memory cells at the intersection of the active word line and the active bit lines is read out to a metadata selection circuit. The metadata selection circuit may use one or more CS sub-select bits (or column sub-select bits) to determine which of the 8 bits are being modified. The CS sub-select bits may be in addition to the normal bits of the column address (e.g., by increasing the number of bits in the column address) and/or may overlap with column address bits already used for other purposes. The bits not selected by the CS sub-select bits are stored in the metadata selection circuit, while the bits which are selected are modified (e.g., overwritten with new metadata values). The modified bits are then rejoined with the non-modified bits, and the updated 8 bits (including the overwritten new metadata bits) are written to the column plane. An error correction code (ECC) circuit also receives the metadata and generates parity based on the data and the metadata. The data, metadata, and parity are written to the array as part of the same access pass. In this manner the non-written bit lines selected by CS are protected, and the parity is based on the data and the metadata which is being written (rather than including the extraneous bits in the metadata column plane which are not being modified).

As used herein, the term data may represent any bits of information that the controller wishes to store and/or retrieve from the memory. The term metadata may represent any bits of information about the data which the controller writes to and/or receives from the memory. For example, the metadata may be information that the controller generates about the data, about how or where the data memory is stored in the memory, about how many errors have been detected in the data, etc. The data and the metadata together represent information written to the memory by a controller and then also read from the memory by the controller, with the data and metadata differing in content and how they are generated in that the metadata is based on information about the data. The term parity may represent any bits generated by an error correction circuit of the memory based on the data, metadata, or combinations thereof. The parity may generally stay within the memory. In some embodiments, the amount of data and/or metadata retrieved as part of a single access operation may represent a set of bits which are a fragment of a larger piece of information. For example, the metadata bits retrieved as part of a single access operation (e.g., 1 or 2 bits) may not have any meaning on their own, but may have meaning when combined with sets of metadata bits retrieved as part of other access operations (e.g., to other memory arrays and/or to the same array at different times).

FIG. 1 is a block diagram of a memory system according to some embodiments of the present disclosure. The memory system 100 includes a memory module 102 and a controller 150 which operates the memory module 102. The module includes a number of memory devices 104 and 110. The memory devices 104 may be used to store data (and its associated metadata) and may generally be referred to as data memory devices 104, while the memory device 110 is used to correct errors in data read from the data memory devices 104. The memory device 110 may be referred to as an error correction memory device 110. A module logic 112 receives commands and addresses over a command/address C/A bus from the controller 150 through a C/A terminal 114 and distributes those commands and addresses to the memory devices 104 and 110 over internal command and address buses (not shown). Data and metadata is communicated between the controller 150 and the module 102 along data buses which couple to data terminals (DQ) terminals 124 of the module 102. The data terminals 124 are organized into pseudo-channels 122 and channels 120. Each channel is a set of data terminals 124 associated with a memory device 104.

As an example, the present disclosure may generally be described with respect to a 9x2p2 memory module 102. In the 9x2p2 architecture, there are nine total memory devices 104 and 110. Eight data memory devices 104(0) to 104(7) and one error correction memory device 110. Each channel 120(0) to 120(7) includes one or more pseudo-channels 122, which may be operated independently of each other. In this embodiment, each channel 120 includes two pseudo-channels 122, each of which includes two data terminals 124. Since the memory devices and channels may generally be similar to each other, only a single device 104(0) and its associate channel 120(0) are described in detail herein. In order to simplify the layout of the figure, an arrangement of two rows of four devices 104 each is shown, and their associated channels 120 are shown as stacked boxes. However the representation of FIG. 1 does not necessarily represent the layout of a physical device. For example, a single row of 8 devices 104 may be used. Similarly, various buses and signal lines have been simplified down to a single line for clarity on the drawing, however, multiple physical signal lines may be represented by a single line in the drawing. Other module architectures may be used in other example embodiments. For example other example architectures may have more or fewer error correction devices and/or more or fewer data devices, may have different numbers of channels, pseudo-channels, and/or terminals per pseudo-channel, or combinations thereof.

During an example write operation, the controller 150 provides a write command and addresses (e.g., row, column, and/or bank addresses as explained in more detail herein) over the C/A terminal 114 to the module 102. The module logic 112 distributes the command and address to the data memory devices 104(0) to 104(7). The controller 150 also provides data and metadata to be written along the various DQ channels 120(0) to 120(7). Since the pseudo-channels 122 may be operated independently, we will consider a single pseudo-channel 122 and its two DQ terminals 124. Each data terminal receives a serial burst of bits, which together represent a codeword of data and additional bits which represent the metadata. For example, each terminal receives 32 data bits in series, for a total of 64 data bits. One or more of the terminals may also receive extra bits as part of the burst which represents the metadata. Each device 104 includes an ECC circuit, which generates parity bits based on the received 64 bits of data and the received bits of metadata and stores the data and the parity in the array.

The amount of metadata may generally be categorized by the amount of metadata which is shared across the data devices 104. For example, in an example embodiment where 2 bytes of metadata are used, across the 8 data devices 104, each device may store 2 bits of metadata for each 64 bits of data. Accordingly, the two data terminals may receive a burst of 33 bits of data, 32 data bits and 1 metadata bit, for a total of 64 data bits and 2 metadata bits. In an example embodiment where 1 byte of metadata is used, across the 8 devices 104 each device may store 1 bit of metadata for each 64 bits of data. Accordingly, one of the two terminals may receive a metadata bit along with 32 data bits for 33 bits total while the other may receive 32 data bits. To keep the length of burst even on the two terminals, the terminal which does not receive the metadata may receive a junk bit or filler bit which is discarded or otherwise ignored. In some embodiments, the individual bits stored in each device 104 may have meaning when pooled together with the other bits stored across the module (e.g., the whole 1 or 2 bytes together may have meaning).

During an example read operation, the controller 150 provides a read command and addresses along the C/A terminal 114. The module logic 112 distributes these to the memory devices 104 to 110 and data and metadata is read out from the locations specified by the addresses. As part of the read operation, each memory device 104 may perform error correction based on the data, metadata, and parity which is read out from the array. The corrected data and metadata is provided off the device to the controller. The parity may generally not be read out to the controller 150. In some embodiments, if the device's error correction detects a mistake then the device 104 may provide a signal to the controller 150 indicating a detected error.

The read and write operations may use a single-access pass to store both the data and parity. For example, each memory device 104 may be capable of accessing up to 136 bits in a single access pass (e.g., generally 128 data bits and 8 parity bits). In some embodiments of the 9x2p2 architecture, 64 data bits plus 1 or 2 metadata bits and a specified number of parity bits are used. Accordingly, the data, metadata, and parity may all be accessed as a single access pass. For example, as explained in more detail herein, the memory array may be split into two portions, each of which is associated with a value of a column plane select bit in the column address. Data may be stored in a selected one of the portions, while the parity and metadata may be stored in an extra column plane or in the non-selected portion. For example, the metadata may be stored in the extra column plane while the parity is stored in one or more data column planes which are part of the non-selected portion.

During an example read operation, the error correction memory device 110 may be used to identify and correct errors in the data. The error correction memory device 110 may support correction of the data and metadata along one DQ terminal (e.g., the 33 bits provided along one of the terminals 124 in a pseudo-channel). The controller 150 may use information stored on the error correction memory device 110 to enable correction of the information after the information is received by the controller 150 during a read operation. For example, the error correction memory device 110 may store repair information (e.g., parity bits) which are associated with the data and metadata read out across all the data devices 104(0) to 104(7), and that parity may be used by a repair circuit (not shown) of the controller 150 to enable correction in the data and metadata of up to one of the DQ terminals. For example, if the data and metadata being provided along a first DQ terminal in a first pseudo-channel associated with memory 104(0) is corrupted, then the error correction device 110 enables the repair of that data and metadata. However, if the errors exist in bits across both DQ terminals in the pseudo-channel then correction may not be possible.

Figure 2:
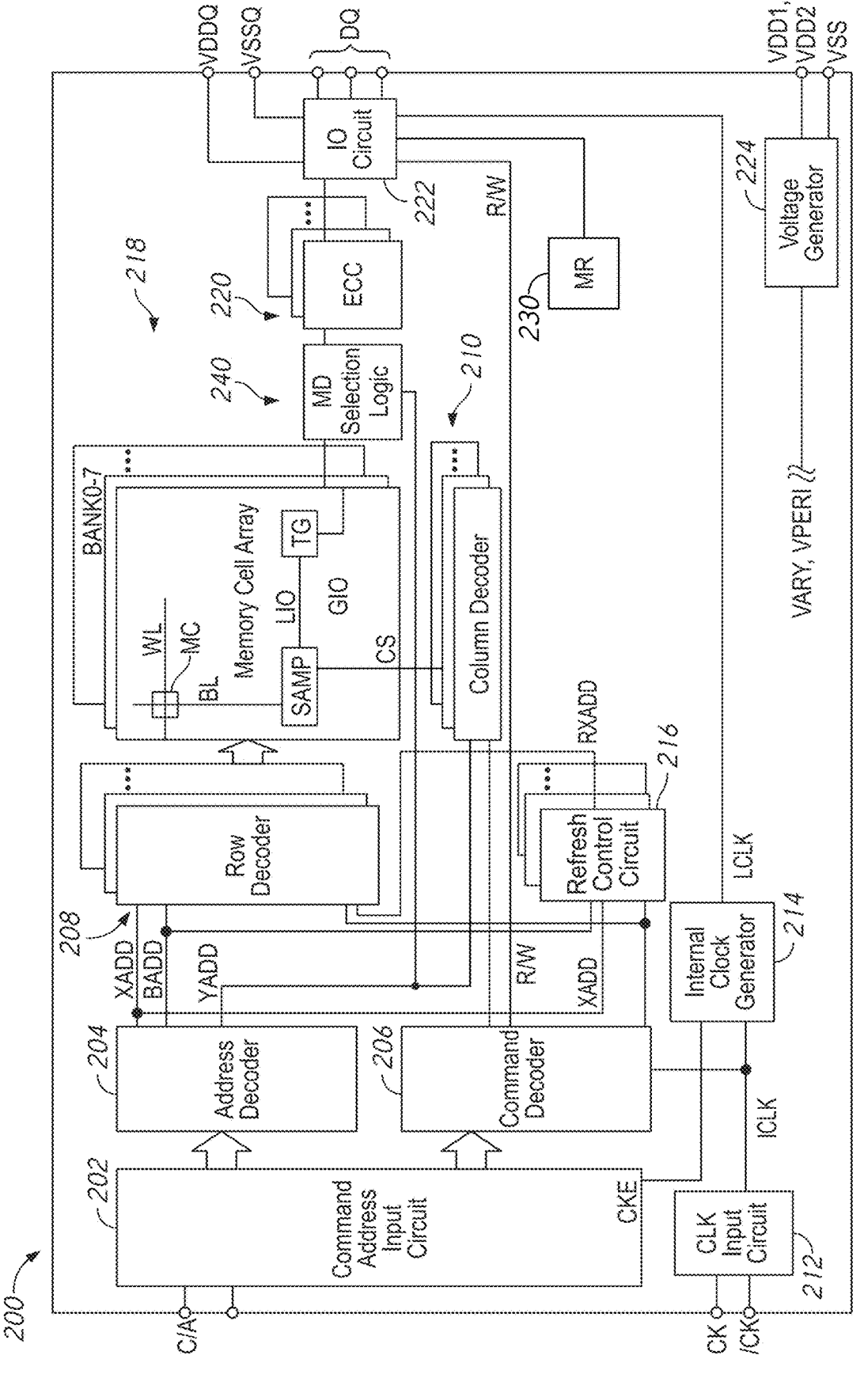
FIG. 2 is a block diagram of a semiconductor device according an embodiment of the disclosure.

FIG. 2 is a block diagram of a semiconductor device according an embodiment of the disclosure. The semiconductor device 200 may be a semiconductor memory device, such as a DRAM device integrated on a single semiconductor chip. In some embodiments of the present disclosure, the memory device 100 may be a standalone memory device. For example, it may be packaged on a chip by itself and the controller may directly access the memory device 200. In some embodiments, the memory device 200 may be packaged together with other memory devices onto a module. For example, the device 200 may implement one of the devices 104 and/or 110 of the module 102 of FIG. 1.

The semiconductor device 200 includes a memory array 218. The memory array 218 is shown as including a plurality of memory banks. In the embodiment of FIG. 2, the memory array 218 is shown as including eight memory banks BANK0-BANK7. More or fewer banks may be included in the memory array 218 of other embodiments.

Each memory bank includes a plurality of word lines WL, a plurality of bit lines BL, and a plurality of memory cells MC arranged at intersections of the plurality of word lines WL and the plurality of bit lines BL. The selection of the word line WL is performed by a row decoder 108 and the selection of the bit lines BL is performed by a column decoder 210. In the embodiment of FIG. 2, the row decoder 208 includes a respective row decoder for each memory bank and the column decoder 210 includes a respective column decoder for each memory bank.

The bit lines BL are coupled to a respective sense amplifier (SAMP). Read data from the bit line BL is amplified by the sense amplifier SAMP, and transferred to an ECC circuit 220 over local data lines (LIO), transfer gate (TG), and global data lines (GIO). Conversely, write data outputted from the ECC circuit 220 is transferred to the sense amplifier SAMP over the complementary main data lines GIO, the transfer gate TG, and the complementary local data lines LIO, and written in the memory cell MC coupled to the bit line BL.

The semiconductor device 200 may employ a plurality of external terminals, such as solder pads, that include command and address (C/A) terminals coupled to a command and address bus to receive commands and addresses, clock terminals to receive clocks CK and/CK, data terminals DQ coupled to a data bus to provide data, and power supply terminals to receive power supply potentials VDD, VSS, VDDQ, and VSSQ. The external terminals may couple directly to the controller (e.g., 150 of FIG. 1) and/or may couple to various buses/connectors of the module (e.g., 102 of FIG. 1).

The clock terminals are supplied with external clocks CK and /CK that are provided to an input circuit 212. The external clocks may be complementary. The input circuit 212 generates an internal clock ICLK based on the CK and /CK clocks. The ICLK clock is provided to the command decoder 206 and to an internal clock generator 214. The internal clock generator 214 provides various internal clocks LCLK based on the ICLK clock. The LCLK clocks may be used for timing operation of various internal circuits. The internal data clocks LCLK are provided to the input/output circuit 222 to time operation of circuits included in the input/output circuit 222, for example, to data receivers to time the receipt of write data. The input/output circuit 222 may include a number of interface connections, each of which may be couplable to one of the DQ pads (e.g., the solder pads which may act as external connections to the device 200).

The C/A terminals may be supplied with memory addresses. The memory addresses supplied to the C/A terminals are transferred, via a command/address input circuit 202, to an address decoder 204. The address decoder 204 receives the address and supplies a decoded row address XADD to the row decoder 208 and supplies a decoded column address YADD to the column decoder 210. The decoded row address XADD may be used to determine which row should be opened, which may cause the data along the bit lines to be read out along the bit lines. The column decoder 210 may provide a column select signal CS, which may be used to determine which sense amplifiers provide data to the LIO. In a write operation, the column decoder 210 may also provide one or more write enable signals which determine which bit lines receive data as part of the write operation. The address decoder 204 may also supply a decoded bank address BADD, which may indicate the bank of the memory array 218 containing the decoded row address XADD and column address YADD.

The column address YADD may include one or more CS sub-select bits. A certain number of bits within the column address may be used to specify a value of the CS signal. A certain number of bits within the column address may be used as CS sub-select bits to specify one or more bit lines within the set of bit lines selected by the CS value. In an example implementation, if there are 64 possible CS values, then six bits may be used to specify the CS value. If that CS value selects a set of 8 bit lines, then the number of CS sub-select bits may be based on the number of bit lines within that set which are selected, which may, in turn, depend on the amount of metadata which is stored. For example, if two bits of metadata are stored, then there may be 2 CS sub-select bits, which allow for 4 values, each of which is associated with a pair of the 8 bits specified by the CS value. If one bit of metadata is stored, then there may be 3 CS sub-select bits, for 8 values, which allows each of the 8 bits selected by the CS value to be individually selected. In some embodiments, the CS sub-select bits may be extra bits which increase the length of the column address YADD. For example, the column address may be two or 3 bits longer than in memory devices where CS sub-select bits are not used.

The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 202. The command decoder 206 includes circuits to decode the internal command signals to generate various internal signals and commands for performing operations. For example, the command decoder 206 may provide signals which indicate if data is to be read, written, etc.

The device 200 may receive an access command which is a write command. When the write command is received, and a bank address, a row address and a column address are timely supplied with the write command, write data supplied to the data terminals DQ by the controller is provided along the data bus and written to memory cells in the memory array 218 corresponding to the row address and column address. The write command is received by the command decoder 206, which provides internal commands such as a CS signal and one or more write enable signals so that the data and metadata received by the IO circuit 222 is written to the array 218. The write data and metadata is supplied via the input/output circuit 222 to the ECC circuit 220. The ECC circuit generates parity bits based on the received data and metadata. The memory 200 reads out a set of bits from a column plane where the metadata is going to be written to a metadata selection logic circuit 240 which stores that set of bits. The metadata selection logic circuit 240 uses the CS sub-select bits of the column address to identify which of that set of bits to overwrite with the metadata bits to generate a modified set of bits. The data, modified set of bits and parity are provided to the memory array 218 to be written along a word line specified by the row address to memory cells specified by the column address. The data, metadata, and parity are written together as part of a single access pass.

The device 200 may receive an access command which is a read command. When a read command is received, and a bank address, a row address and a column address are timely supplied with the read command, read data, read metadata, and read parity is read from memory cells in the memory array 218 corresponding to the row address and column address. The read command is received by the command decoder 206, which provides internal commands so that read data, read metadata, and read parity from the memory array 218 is provided to the ECC circuit 220. A set of bits is read out from the column plane where the metadata is stored and the metadata selection logic circuit 240 uses the CS sub-select bits of the column address to determine which of those bits are the metadata. The selected metadata bits are passed along with the data and parity to the ECC circuit 220. The ECC circuit 220 detects and/or corrects errors in the data and metadata based on the parity. The correct read data and metadata is provided along the data bus, and the data and metadata is output to outside from the data terminals DQ via the input/output circuit 222. The data, metadata, and parity may be read out as part of a single access pass.

The device 200 includes refresh control circuits 216 each associated with a bank of the memory array 218. Each refresh control circuit 216 may determine when to perform a refresh operation on the associated bank. The refresh control circuit 216 provides a refresh address RXADD (along with one or more refresh signals, not shown in FIG. 1). The row decoder 208 performs a refresh operation on one or more word lines associated with RXADD. The refresh control circuit 216 may perform multiple types of refresh operation, which may determine how the address RXADD is generated, as well as other details such as how many word lines are associated with the address RXADD.

The ECC circuit 220 may detect and/or correct errors in the accessed data. As part of a write operation, the ECC circuit 220 may receive bits from the IO circuit 222 and generate parity bits based on those received bits. The received bits and parity bits are written to the memory array 218. During an example read operation, the ECC circuit 220 receives a set of bits and their associated parity bits from the array 218 and uses them to locate and/or correct errors. The ECC circuit 220 may correct the information and then provide the corrected information (and/or a signal indicated detected errors) to the IO circuit 222. The parity bits may generally not be provided to the IO circuit 222.

The memory 200 may be operated in various modes based on a number of the DQ pads which are used. In some embodiments, the mode register 230 may include settings which determine how many DQ pads are used, even if there are more DQ pads available. The mode may determine both how many DQ pads the controller expects to send/receive data along, as well as the format and/or number of bits which the controller expects as part of a single access command. For example, the memory may have 16 physical DQ pads. In a 2p2 mode, four of those DQ pads are used, divided into two pseudo-channels of two DQ pads each. The mode may also determine a burst length at each DQ terminal as part of a DQ operation. The burst length represents a number of serial bits at each DQ terminal during an access operation. For example, in the 2p2 mode, each data terminal may receive a burst of 32 data bits plus some number of metadata bits (e.g., either 1 or 2 bits).

The power supply terminals are supplied with power supply potentials VDD and VSS. The power supply potentials VDD and VSS are supplied to an internal voltage generator circuit 224. The internal voltage generator circuit 224 generates various internal potentials VARY, and the like based on the power supply potentials VDD and VSS supplied to the power supply terminals.

The power supply terminals are also supplied with power supply potentials VDDQ and VSSQ. The power supply potentials VDDQ and VSSQ are supplied to the input/output circuit 222. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 3:
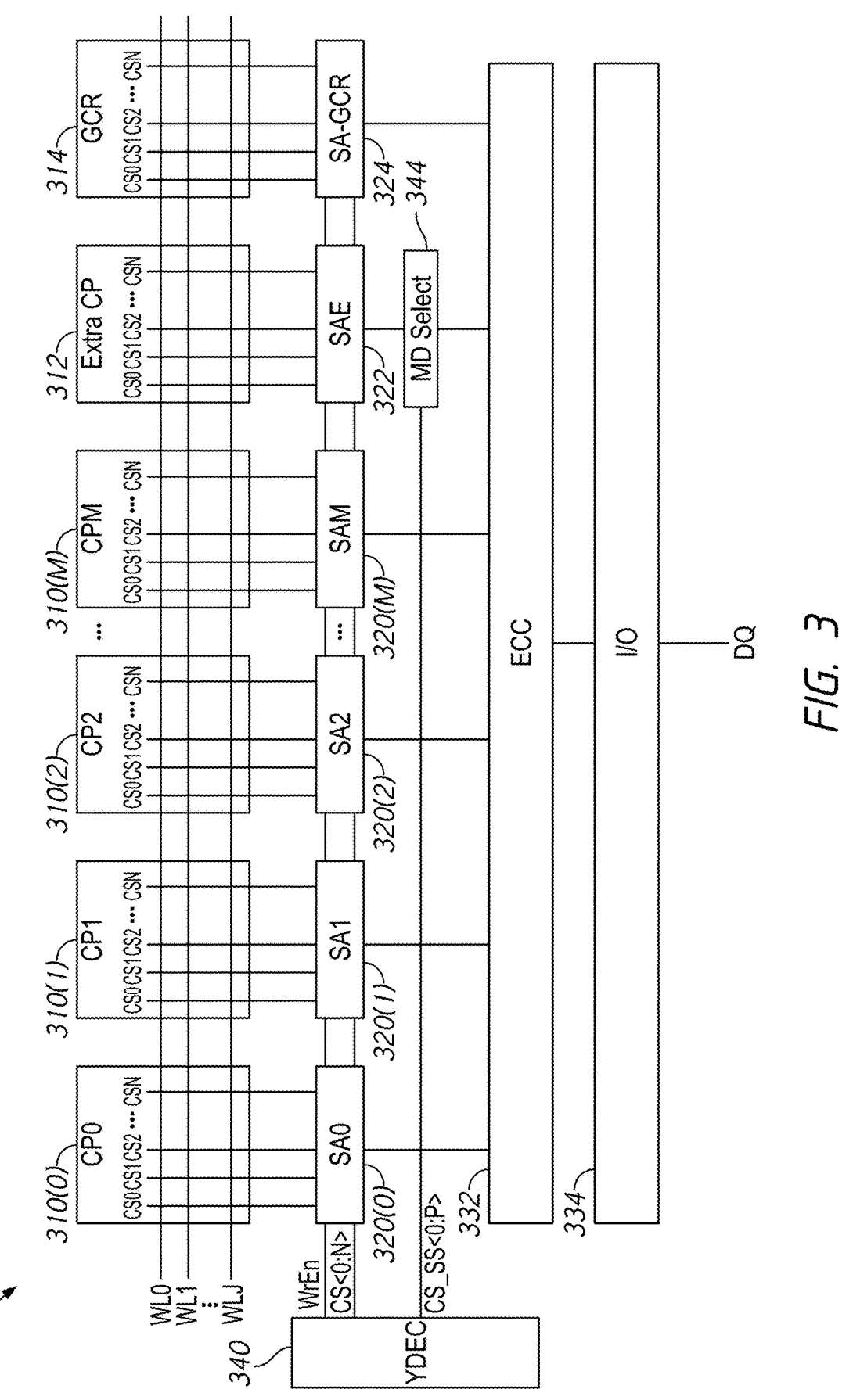
FIG. 3 is a block diagram of a memory device according to some embodiments of the present disclosure.

FIG. 3 is a block diagram of a memory device according to some embodiments of the present disclosure. The memory device 300 may, in some embodiments, represent a portion of the memory device 200 of FIG. 2. The view of FIG. 3 shows a portion of a memory array 310-314 and 320-324 which may be part of a memory bank (e.g., 218 of FIG. 2) along with selected circuits used in the data path such as the ECC circuit 332 (e.g., 220 of FIG. 2) and IO circuits 334 (e.g., 222 of FIG. 2). For clarity certain circuits and signals have been omitted from the view of FIG. 3.

The memory device 300 is organized into a number of column planes 310-314. Each of the column planes represents a portion of a memory bank. Each column plane 310-314 includes a number of memory cells at the intersection of word lines WL and bit lines. The word lines may be extend across multiple of the column planes 310-314. The bit lines may be grouped together into sets which are activated by a value of a column select (CS) signal and (during a write operation) and a write enable signal WrEn provided by a column decoder 340 (e.g., 210 of FIG. 2). For the sake of clarity, only a single vertical line is used to represent the bit lines of each column select set, however, there may be multiple columns accessed by that value of CS. For example, each line may represent 8 bit lines, all accessed in common by a value of CS. There may be N+1 sets of bit lines (e.g., 64 sets), each associated with a value of the CS signal. As used herein, a 'value' of CS may refer to a value of a multibit signal or one of the signal lines activated after that multibit signal is decoded. For example, since there are N+1 sets of bit lines, then each set may be associated with a value of a multibit signal with at least N+1 values, or one of N+1 individual CS signals after the column decoder 340 decodes the multibit signal. In an example embodiment, N may be 63, and thus the multibit signal may have 6 bits. The multibit signal may be included in the column address YADD. The column decoder also provides a column sub-select signal CS_SS which is used to select one or more bit lines within the set selected by the value of CS.

The memory 300 includes a set of data column planes 310 as well as an extra column plane 312. The extra column plane 312 may be used to store the metadata. The data may be stored in a selected portion of the data column planes 310 and the parity may be stored in one or more column planes in a non-selected portion of the data column planes 310. In some embodiments, the memory 300 may also include an optional global column redundancy (GCR) column plane 314. In some embodiments, the GCR plane 314 may have fewer memory cells (e.g., fewer column select groups) than the data column planes 310. The GCR CP 314 includes a number of redundant columns which may be used as part of a repair operation. If a value of the CS signal is identified as including defective memory cells in one of the data column planes 310, then the memory may be remapped such that the data which would have been stored in that column plane for that value of CS is instead stored in the GCR CP 314.

In an example embodiment, the memory 310 may include 16 data column planes 310(0)-310(15). Each of those data column planes 310 includes 64 sets of column selects activated by a respective value of the column select signal, and each set of column select includes 8 bit lines. Accordingly, when a word line is opened responsive to a row address, if a column select signal is provided to each of the 16 column planes then 8 bits are accessed from each of the 16 column planes for a total of 128 bits. The column select signal may also be provided to the extra column plane 312, although that column select signal may be a different value than the one provided to the data column planes 310 for an additional 8 bits (e.g., which may generally be parity bits). If a repair has been performed, the GCR CP 314 may also be accessed by providing a value of the CS signal, and the values which are read out from the GCR 315 onto a GCR LIO may be used while ignoring the LIO of the column plane it is replacing. Accordingly, the maximum number of bits that can be retrieved as part of an access pass is 128 bits from the data column planes 310 (with 8 bits substituted from the GCR CP 314 if there has been a repair) along with 8 additional bits from the extra CP 312.

In example embodiments of the present disclosure, a 2p2 architecture may be used, where fewer than 128 bits of data are accessed for a given access operation. Accordingly, only a portion of the data column planes 310 may be used to send/receive data. The column address may include a column plane select bit or bits which are used to determine which portion of the data column planes 310 are used. For example, the data column planes 310 may be split into two portions of eight data column planes each. A bit of the column address (e.g., an $11^{th}$ bit of the column address or CA10) may be used as the column plane select bit and may select which portion of the data column planes 310 is being used to store data as part of the current access operation.

During a given access operation, data may be stored in the portion of the column planes selected by the column plane select bit, metadata may be stored in the extra column plane 312 and the parity may be stored in a column plane in the portion of the data column planes 310 which was not selected by the column plane select bit. The ECC circuit 332 generates a number of parity bits based on those data bits and the metadata bits. For example, the ECC circuit may generate 8 parity bits based on the 64 data bits and the 1 or 2 metadata bits (e.g., 65 or 66 bits total). In example embodiments where 8 bits of parity are used, the parity may be stored in a single column plane in the non-selected portion (e.g., not selected by CA10) of the data column planes 310.

For example, if the column plane select bit selects column planes 0 to 7, then the data may be stored in each of the column planes 310(0)-310(7), the metadata is stored in the extra column plane 312 and the parity may be stored in one of the column planes 310(8) to 310(15). Other arrangements of which column planes are selected by the column plane select bit (e.g., even and odd column planes) may be used in other example embodiments. The CS signals provided to the selected portion of the data column planes 310 where the data is stored, the extra column plane 312 where the metadata is stored, the non-selected data column plane 310 where the parity is stored, and the GCR column plane 314 (if applicable) may be the same value, different values, or combinations thereof.

The memory 300 may use a RMW cycle when writing the metadata bits to the extra column plane 312. Since eight bits are accessed by a value of the CS signal in the extra column plane 312 but since there are fewer metadata bits (e.g., 1 or 2) written during the write operation, it may be useful to prevent the extra bits selected by the value of the CS signal from being inadvertently modified. During a write operation, a CS signal value is provided to the extra column plane 312 and all 8 bits selected by that CS signal value are read out of a metadata selection circuit 344 (e.g., 240 of FIG. 2). The metadata select circuit 344 selects the bits (e.g., 1 or 2 bits) of that set which are going to be modified based on the CS sub-select signal CS_SS from the column decoder 340. The set, including the modified bits are then written back to the extra column plane 312.

Similar to the CS signal, a value of the CS_SS signal may refer to a value of a multibit signal (e.g., column sub-select bits of the column address) or a signal line which is activated after that multibit signal is decoded. For example, if there are 8 values of the CS_SS signal, that may refer to the possible values of a 3 bit signal, or one of 8 signal lines activated after that 3 bit signal is decoded. The column sub-select signal CS_SS may have a number of values based on the desired level of granularity of the selecting the bitlines within the set of bitlines activated by a given value of CS. In an example embodiment where 2 bits of metadata is used, then 4 values of the CS_SS signal may be used, each of which selects two bits (e.g., two bit lines) in the set of 8 bit lines selected by CS. In an example embodiment where 1 bit of metadata is used, then 8 values of the CS_SS signal may be used, each of which activates one of the bits (e.g., one bit line) in the set of 8 bit lines selected by CS.

In an example write operation, a controller (e.g., 150 of FIG. 1) provides data and metadata to the memory device through the I/O circuit 334. The ECC circuit 332 generates parity bits based on the data and the metadata. The column decoder provides a CS value to the extra column plane 312 and a set of bits is read out from the memory cells at the intersection of the active word line and the bit lines selected by that CS value. The set of bits is stored in the metadata select circuit 344. The column decoder also provides a value of CS_SS based on the value of the CS sub-select bits in the column address and the set of bits is modified by having a selected portion of the bits based on the value of CS_SS overwritten with the metadata bits. The data is written to memory cells at the intersection of the word line and a value of the CS signal provided to a selected portion of the data column planes 310. The modified set of bits is written back to the memory cells they were read from in the extra column plane 312. The parity is written to memory cells at the intersection of the word line and bit lines selected by a CS value provided to one of the data column planes 310 which was non-selected by the column plane select bit. The write operation may be a single-pass write operation, since the RMW cycle used to write the metadata may happen as part of the same access operation as writing the data and parity.

In the example discussed herein, the IO circuit receives 64 bits of data in two bursts of 32 bits along with 1 or 2 bits of metadata (e.g., as part of 1 or 2 bytes distributed across the module). The data and metadata is provided to the ECC circuit 332 which generates a set of 8 parity bits based on the data and metadata. Based on the column address half of the data column planes 310 may be selected and the column decoder 340 may provide a first value of the CS signal along with the write enable signal WrEN to the selected half of the column planes. The data may be written to the memory cells at the intersection of the active word line and the bit lines selected by the first value of CS in the selected half of the column planes 310. The column decoder 340 also provides a second value of the CS signal (which may be the same or different as the first CS signal value) along with the write enable signal WrEn to one of the data column planes 310 in the half of the data column planes which was not selected by the column plane select bit. The 8 parity bits are written to the memory cells at the intersection of the word line and the bit lines associated with the second values of the CS signal in that column plane. The column decoder 340 also provides a third value of the CS signal (which may be the same or different than the first and/or second values of the CS signal) to the extra column plane 312, and a value of CS_SS to the MD select circuit 344, which performs a RMW to write the metadata to the extra column plane 312.

In an example read operation, the data, metadata, and parity are retrieved as part of a single access pass. For example, if the read operation is to retrieve the same data and metadata which was written in the above example write operation, the column decoder 340 provides the first CS signal to the selected portion of the column planes 310 (based on the column plane select bit) and the data bits are read from memory cells at the intersection of the active word line and the bit lines activated by the first CS signal value in the selected portion of the column planes 310. The column decoder 340 also provides the second CS signal to the non-selected data column plane to retrieve the parity. The column decoder 340 also provides the third CS signal value to the extra column plane. Responsive to this, all 8 bits associated with the third CS signal value are read out, which includes the 1 or 2 metadata bits (as well as 6 or 7 extraneous bits, which may be metadata bits associated with other data storage locations). Since the extraneous bits were not used as part of the ECC circuit's 332 calculation of the parity bits, the extraneous bits must be removed. The column decoder provides a value of CS_SS to the metadata select circuit 344, which provides the selected metadata bits from the set of bits from the extra column plane 312. The data, metadata, and parity are provided to the ECC circuit 332 which performs error correction on the data and metadata based on the received bits. The level of correction performed by the ECC circuit 332 may be based on the number of parity bits (e.g., based on a setting in the mode register). For example, based on the setting the ECC circuit 332 may perform single error correction (e.g., SEC) or SEC double error detection (SECDED). The corrected data bits and metadata bits are provided to the I/O circuit 334, where they provided to the DQ terminals.

Figure 4:
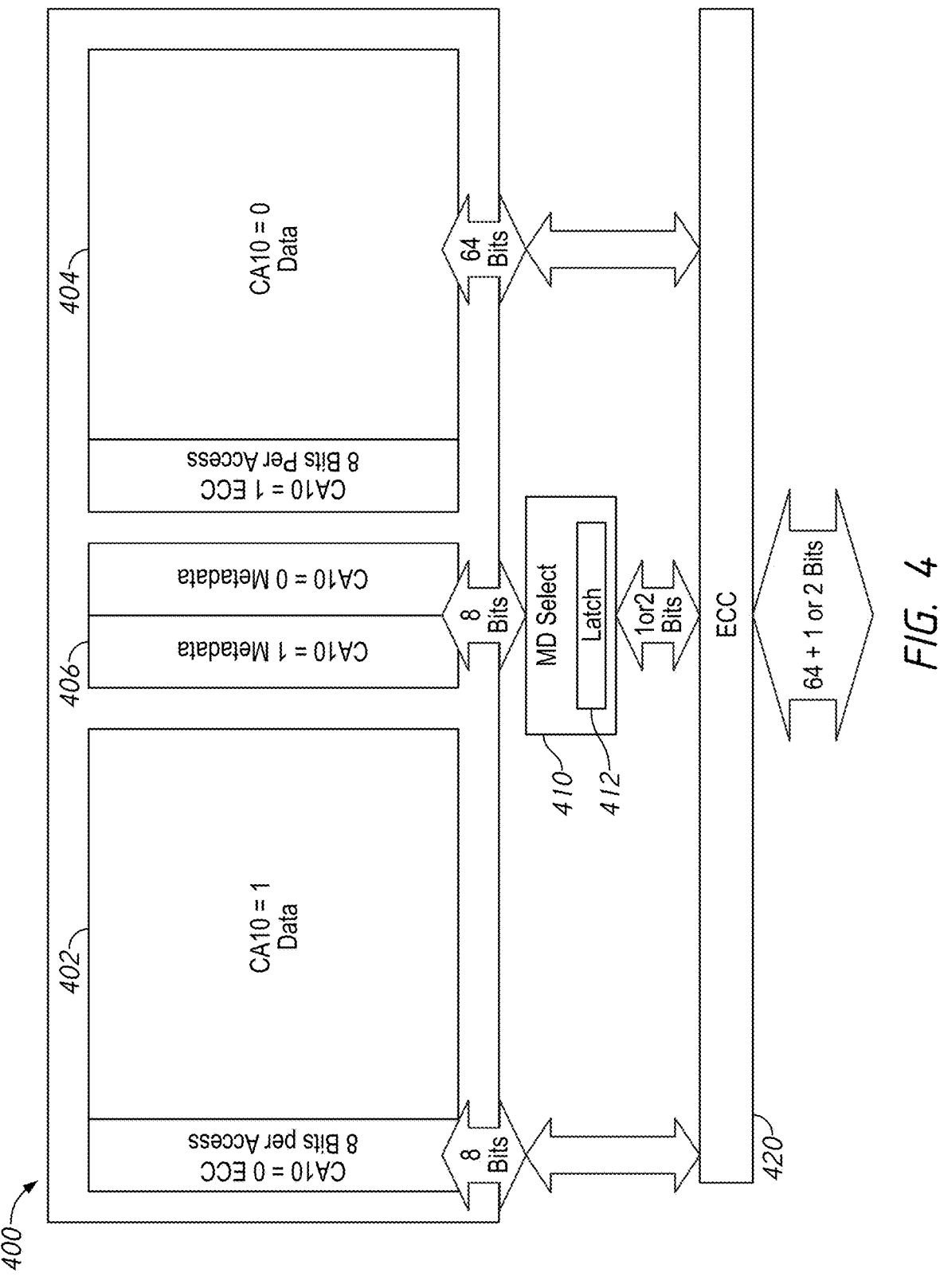
FIG. 4 is a block diagram of a memory array according to some embodiments of the present disclosure.

FIG. 4 is a block diagram of a memory array according to some embodiments of the present disclosure. The memory 400 may, in some embodiments, implement the memory array in a memory device such as 104-110 of FIG. 1, 200 of FIG. 2, or 300 of FIG. 3. The memory array 400 of FIG. 4 is a representation of the how information is distributed in the array, rather than a representation of the physical layout of information within the array. The diagram of FIG. 4 shows which percentage of space within the array is used for different purposes. Along with the array, a metadata selection circuit 410 (e.g., 240 of FIG. 2 and/or 344 of FIG. 3) and an ECC circuit (e.g., 220 of FIG. 2 and/or 332 of FIG. 3) are shown.

The memory array 400 includes data column planes 402 and 404 (e.g., 310 of FIG. 3) and an extra column plane 406 (e.g., 312 of FIG. 3). The data column planes are shown split into two portions 402 and 404, each of which is associated with a value of a column plane select bit CA10. When the column plane select bit is in a low logical state (e.g., CA10=0) then data is stored in the portion 404, and parity is stored in the portion 402. When the column plane select bit is in a high logical state (e.g. CA10=1) then data is stored in the portion 402 and parity is stored in the portion 404. The metadata is stored in the extra column plane for both values of the column plane select bit.

FIG. 4 shows arrows which represent the flow of information in an example access operation where the column plane select bit (e.g., CA10) indicated a first portion (e.g., a first half) of the data column planes. As part of an example write, the data (64 bits) and metadata (1 or 2 bits) is provided to the ECC circuit, which generates parity (8 bits) based on the 65 or 66 received bits of data and metadata. A set of bits is read out from the extra column plane 406 and stored in the latch 412 of the metadata select circuit 410. Based on a value of a CS sub-select signal, a subset of that set of bits is modified (e.g., by overwriting with the 1 or 2 metadata bits) to generate a modified set of bits (which include the 1 or 2 metadata bits). The data is written to the portion 404, the parity is written to the portion 402, and the modified set of bits (including the metadata) is written to the extra column plane 406.

As part of an example read operation on the same information, the data (64 bits) is read out from the portion 404 and the parity (8 bits) is read out from the portion 402. The set of 8 bits is read from the extra column plane 406 to the metadata select circuit 410, which passes only the 1 or 2 bits associated with a value of the CS sub-select signal. Accordingly, the ECC circuit receives the 64 data bits, the 1 or 2 metadata bits and the 8 parity bits. In this way, the ECC circuit 420 does not receive the extra 6 or 7 bits which are part of the set of bits accessed by the value of CS in the extra column plane. The ECC circuit 420 performs corrections on the data and metadata and provides the data and metadata to the I/O circuit.

FIG. 5 is a flow chart of a method of writing metadata according to some embodiments of the present disclosure. The method 500 may, in some embodiments, be implemented by one or more apparatuses or systems disclosed herein. For example, the method 500 may be implemented by the memory system 100 of FIG. 1, memory device 200 of FIG. 2, 300 of FIG. 3, and/or memory array 400 of FIG. 4.

The method 500 may generally begin with box 510, which describes receiving a write command and a column address including column sub-select bits. The column address may include a set of column select bits and a set of column sub-select bits. The method 500 may include receiving the write command and the column address from a controller (e.g., 150 of FIG. 1) along a C/A terminal (e.g., 114 of FIG. 1 and/or the C/A terminal of FIG. 2).

Box 510 may generally be followed by box 520, which describes receiving a plurality of data bits and at least one metadata bit. For example, the data bits and at least one metadata bit may be received from the controller along a data bus and DQ terminals of the memory device. The method 500 may include receiving a burst of information along at least one data terminal which includes the data and the at least one metadata bit. For example the method 500 may include receiving 33 bit bursts along two DQ terminals, each of which includes 32 bits of data and either 1 bit each of metadata or 1 bit of metadata and 1 filler bit.

The method 500 may include generating a first column select signal based on the column address, and writing the plurality of data bits to memory cells indicated by the first column select signal. The method 500 may also include selecting a first portion of a plurality of data column planes or a second portion of the plurality of data column planes based on a column plane select bit of the column address. The method 500 includes providing the first column select signal to the selected one of the first portion or the second portion and writing the data to the memory cells at the intersection of the word line and the bit lines in the selected first or second portion associated with the first column select signal value.

The method 500 may also include generating parity based on received data and metadata bits. The method 500 may include receiving the data and the metadata along data terminals from the controller. An ECC circuit (e.g., 220 of FIG. 2, 332 of FIG. 3, and/or 420 of FIG. 4) may generate the parity. For example, the method 500 may include receiving 64 bits of data, 1 or 2 bits of metadata (depending on the embodiment) and generating 8 parity bits based on those 65 or 66 bits.

The method 500 may also include providing a second column select signal value to a column plane in the non-selected one of the first or the second portion and writing the parity to the column plane in the non-selected one of the first or the second portion.

Box 520 may generally be followed box 530, which describes reading a set of bits from an extra column plane. The method 500 may include activating a word line based on a row address with a row decoder. The method 500 may include providing a column select signal (e.g., a third column select signal) and reading the set of bits from the memory cells at the intersection of the word line and the bit lines in the extra column plane associated with the third value of the column select signal. The method 500 may include storing the set of bits in a metadata select circuit (e.g., 240 of FIG. 2, 344 of FIG. 3, and/or 410 of FIG. 4). In embodiments where an ECC circuit is used, the ECC circuit may provide the at least one metadata bit to the metadata select circuit after generating the parity. The parity may be based on the at least one metadata bit, but not on the other bits in the set of bits.

Box 530 may generally be followed by box 540, which describes selecting a subset of the set of bits based on a value of the column sub-select bits. For example, the method may include decoding the value of the column sub-select bits into a column sub-select signal, and selecting the subset based on the column sub-select signal with a metadata select circuit (e.g., 240 of FIG. 2, 344 of FIG. 3, and/or 410 of FIG. 4). In some embodiments, the method 500 may include selecting a single bit of the set of bits. In some embodiments, the method 500 may include selecting two of the set of bits.

Box 540 may generally be followed by box 550, which describes generating a modified set of bits by overwriting the selected subset of the set of bits with the at least one metadata bit. For example, the method 500 may include storing the set of bits read out from the extra column plane and then replacing the bits selected by the column sub-select bits with the at least one metadata bit.

Box 540 may generally be followed by box 550, which describes writing the modified set of bits to the extra column plane. The method 500 may include writing the modified set of bits to the location that the set of bits was read from. The method 500 may include providing the column select signal (e.g., the third column select signal) to the extra column plane and writing the modified set of bits to the bit lines associated with the third column select signal.

The method 500 may also include receiving a read command, reading the modified set of bits from the extra column plane, selecting the at least one metadata bit from the modified set of bits based on the value of the column sub-select bits and providing the selected at least one metadata bit to the ECC circuit. The method 500 may include determining errors (e.g., detecting and/or correcting errors) in the plurality of data bits and the at least one metadata bit with the ECC circuit.

The method 500 may include decoding the column select bits of the column address and generating the first, the second, and or the third column select signal based on the decoded column select bits. The method 500 may include decoding the column sub-select bits and generating the value of the column sub-select signal based on the decoded bits.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims

What is claimed is:

1. An apparatus comprising:
a memory array comprising a plurality of column planes and an extra column plane;
an error correction code (ECC) circuit configured to generate a plurality of parity bits based on a plurality of data bits and at least one metadata bit;
a column decoder configured to receive a column address which includes column select bits and column sub-select bits, wherein as part of a write operation the column decoder is configured to write the plurality of data bits and the plurality of parity bits to the plurality of column planes based on the column select bits, read out a set of bits from the extra column plane based on the column select signal, modify a subset of the set of bits with the at least one metadata bit, wherein the subset is selected based on the column sub-select bits, and write the modified set of bits to the extra column plane.

2. The apparatus of claim 1, wherein the column decoder is configured to provide a first column select signal, a second column select signal, and a third column select signal based on the column select bits, wherein the column decoder is configured to write the plurality of data bits to a first portion of the plurality of column planes based on the first column select signal, to write the plurality of parity bits to a second portion of the plurality of column planes based on the second column select signal, and read the set of bits and write the modified set of bits to the extra column plane based on the third column select signal.

3. The apparatus of claim 2, wherein the column decoder is configured to select the first portion of the plurality of bit lines based on a column plane select bit of the column address.

4. The apparatus of claim 1, further comprising a metadata select circuit configured to store the set of bits read from the extra column plane.

5. The apparatus of claim 4, wherein the column decoder is configured to provide a column sub-select signal based on the column sub-select bits and wherein the metadata select circuit is configured to select the subset of the set of bits based on the column sub-select signal.

6. The apparatus of claim 1, wherein as part of a read operation the column decoder is configured to read the plurality of data bits and the plurality of parity bits from the plurality of column planes to the ECC circuit, read the modified set of bits from the extra column plane, select the at least one metadata bit from the modified set of bits and provide the at least one metadata bit to the ECC circuit.

7. The apparatus of claim 1, wherein each value of column sub-select bits is associated with a single bit of the set of bits.

8. The apparatus of claim 1, wherein each value of column sub-select bits is associated with a pair of bits of the set of bits.

9. An apparatus comprising:
a memory array comprising a column plane;
a column decoder configured to generate a column select signal value based on column select bits in a column address and configured to generate a column sub-select signal value based on column sub-select bits of the column address; and
a metadata select circuit,
wherein as part of a write operation the column decoder is configured to read a set of bits from bit lines of the column plane selected based on the column select signal value,
wherein as part of the write operation the metadata select circuit is configured to select a subset of the set of bits based on the column sub-select signal value and generate a modified set of bits by overwriting the selected subset of the set of bits with at least one metadata bit, and
wherein as part of the write operation the column decoder is configured to write the modified set of bits to the bit lines of the column plane.

10. The apparatus of claim 9, wherein the metadata select circuit comprises a latch configured to store the set of bits.

11. The apparatus of claim 9, further comprising an error correction code (ECC) circuit configured to generate a plurality of parity bits based on a plurality of data bits and the at least one metadata bit.

12. The apparatus of claim 11, wherein the memory array further comprises a first plurality of column planes and a second plurality of column planes,
wherein as part of the write operation the column decoder is configured to generate a first column select signal value based on the column select bits and write the plurality of data bits to the first plurality of column planes, and wherein as part of the write operation the column decoder is configured to generate a second column select signal value based on the column select bits and write the plurality of parity bits to one of the second plurality of column planes, and wherein as part of the write operation the column decoder is configured to generate a third column select signal value as the column select signal, and to read the set of bits from the bit lines of the column plane and write the modified set of bits to the bit lines of the column plane associated with the third column select signal value.

13. The apparatus of claim 9, wherein as part of a read operation the column decoder is configured to read the modified set of bits to the metadata select circuit, wherein as part of the read operation the metadata select circuit is configured to select the at least one metadata bit from the modified set of bits based on the column sub-select signal value, and provide the selected at least one metadata bit.

14. The apparatus of claim 13, further comprising an error correction code (ECC) circuit, wherein as part of the read operation the ECC circuit is configured to receive a plurality of data bits, the at least one metadata bit selected by the metadata select circuit, and a plurality of parity bits, wherein the plurality of parity bits are based, in part, on the at least one metadata bit and not based on others of the modified set of bits.

15. A method comprising:

receiving a write command and a column address including column sub-select bits;

receiving a plurality of data bits and at least one metadata bit;

reading a set of bits from an extra column plane;

selecting a subset of the set of bits based on a value of the column sub-select bits;

generating a modified set of bits overwriting the selected subset of the set of bits with the at least one metadata bit; and writing the modified set of bits to the extra column plane.

16. The method of claim 15, further comprising:

generating a plurality of parity bits based on the plurality of data bits and the at least one metadata bit; and writing the plurality of data bits and the plurality of parity bits to a plurality of data column planes.

17. The method of claim 16, wherein the column address includes column select bits, the method further comprising:

selecting a portion of the plurality of data column planes based on a value of the column select bits;

writing the plurality of data bits to the selected portion of the plurality of data column planes; and writing the plurality of parity bits to at least one column plane of a non-selected portion of the plurality of data column planes.

18. The method of claim 15, wherein the column address includes column select bits, the method further comprising:

generating a column select signal with a value based on the column select bits;

reading the set of bits from a set of bit lines in the extra column plane associated with the value of the column select signal; and writing the modified set of bits to the set of bit lines in the extra column plane associated with the value of the column select signal.

19. The method of claim 15, further comprising:

receiving a read command and the column address including the column sub-select bits;

reading the modified set of bits from the extra column plane;

selecting the at least one metadata bit from the modified set of bits based on the value of the column sub-select bits; and providing the selected at least one metadata bit to an error correction code (ECC) circuit.

20. The method of claim 19, further comprising:

reading the plurality of data bits from a plurality of data column planes; and determining errors in the plurality of data bits and the at least one metadata bit with the ECC circuit.

* * * * *